United States Patent [19]
McKeown

[11] Patent Number: 5,149,270
[45] Date of Patent: Sep. 22, 1992

[54] APPARATUS FOR PRACTICING SURGICAL PROCEDURES

[76] Inventor: M. J. McKeown, 4405 Coast Hwy., North Bend, Oreg. 97459

[21] Appl. No.: 604,496

[22] Filed: Oct. 29, 1990

[51] Int. Cl.$^5$ .............................................. G09B 23/28
[52] U.S. Cl. .................................... 434/262; 434/267
[58] Field of Search .............. 434/262, 267, 272, 273, 434/258

[56] References Cited

U.S. PATENT DOCUMENTS

| | | | |
|---|---|---|---|
| 3,775,865 | 12/1973 | Rowan | 434/262 |
| 4,459,113 | 7/1984 | Boscaro Gatti et al. | 434/272 |
| 4,789,340 | 12/1988 | Zikria | 434/262 X |
| 4,907,973 | 3/1990 | Hon | 434/262 |

FOREIGN PATENT DOCUMENTS

| | | | |
|---|---|---|---|
| 1298794 | 3/1987 | U.S.S.R. | 434/262 |
| 2195808 | 3/1988 | United Kingdom | 434/262 |

OTHER PUBLICATIONS

26330 "Semm Pelvi Trainer", Storz-Carl, Storz Endoskope.

*Primary Examiner*—Richard J. Apley
*Assistant Examiner*—Karen A. Richard
*Attorney, Agent, or Firm*—Robert L. Harrington

[57] ABSTRACT

A method and apparatus for simulation of conditions under which endoscopic procedures may be practiced by an individual to learn and improve on the skills of manipulation and use of instrumentation and to develop the manual dexterity required. The apparatus has a cavity in which an object simulating a human organ is mounted for performing the practice procedure. The cavity is closeable to outside view or access thus forcing the individual practicing a procedure to use and manipulate the instruments under conditions that mimic real life operating and diagnostic conditions.

13 Claims, 6 Drawing Sheets

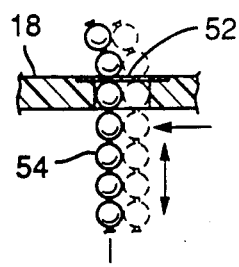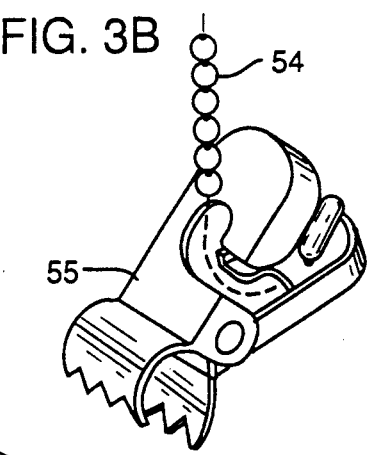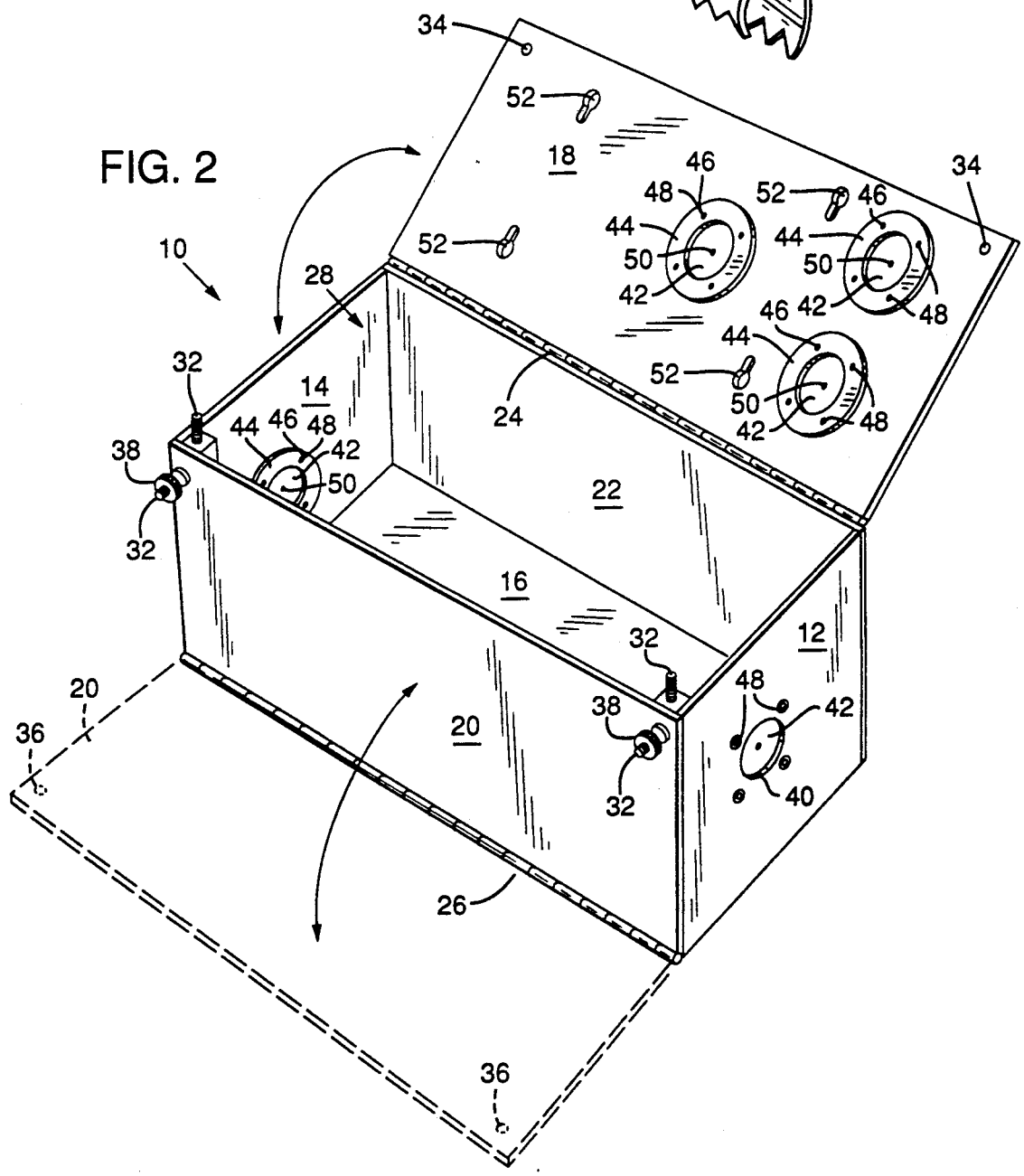

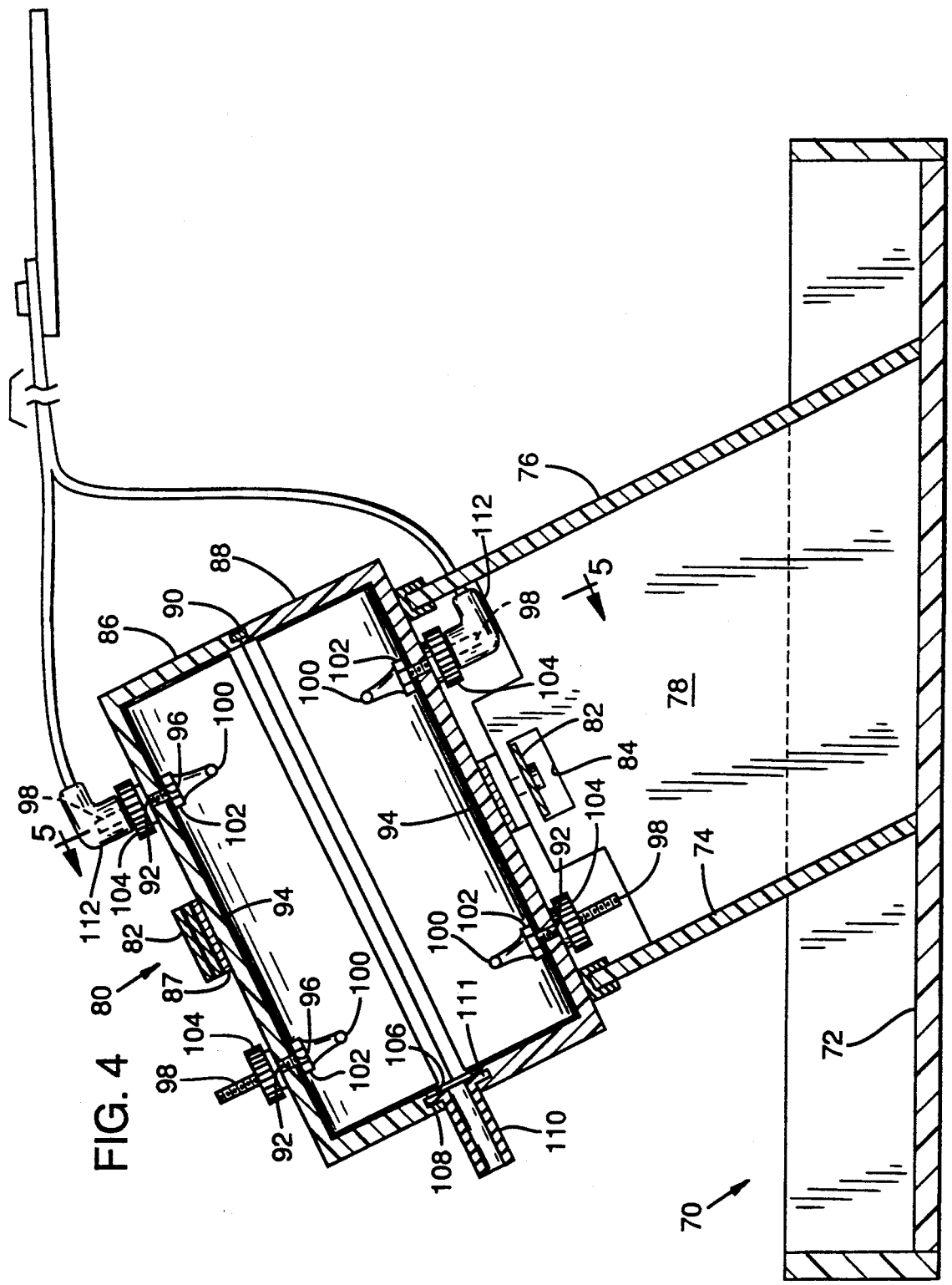

APPARATUS FOR PRACTICING SURGICAL PROCEDURES

BACKGROUND INFORMATION

1. Field of the Invention

This invention relates to surgical training and in particular it relates to simulators that incorporate features to simulate visual and manipulation conditions under which surgeons operate for training surgeons in surgical procedures such as in laparoscopy and hysteroscopy.

2. Background of the Invention

Instruments and techniques have been developed to make surgery less traumatic to a patient. In the case of a laparoscopy, the patient's abdomen is punctured in at least two places. An instrument is inserted through one of the punctures and a viewing scope is inserted through the other. In some cases, a third puncture will be used for insertion of a second instrument and in other cases, a puncture opening will be used for inserting a clamp to position the object, i.e., human organs, being operated on. Operations such as tumor removal are commonly performed without the scarring and lengthy healing process typical for such operations in the past.

In the case of a hysteroscopy, a viewing scope and surgical instrument are combined into a single tube that is inserted through the patient's cervix. The instrument is designed to be delicately maneuvered and again tumors and the like can be removed from the interior wall of the uterus without having to make incisions requiring lengthy healing time.

A major problem encountered in the development of the above-mentioned surgical processes is the training of surgeons. Performing delicate operations on objects without having the object exposed, i.e., viewing the object through a viewing scope, requires unnatural eye-hand coordination. Thus, it is highly desirable that the skills for performing such surgeries are developed using a simulator.

Insofar as known, the only simulator available for training surgeons in the techniques generally described above is the "SEMM PELVI-TRAINER" produced by Storz-Carl Storz "Endoskope". This simulator consists of a lower tray on which an object representing a human organ is positioned. An upper tray has puncture simulating openings through which surgical instruments and a viewing scope are inserted. The trainee maneuvers the instrument through the opening and operates on the object.

The Pelvi-trainer has a number of deficiencies. The individual-trainee can actually view the object through the plastic tray and the sides are open for direct visual observance. The trainee-individual is not forced into an operation simulating a true surgical situation where the object cannot be seen except through the viewing scope.

BRIEF SUMMARY OF THE INVENTION

The preferred embodiment of the present invention provides a simulator that (a) is enclosed so that the trainee has to develop the eye-hand coordination where the object is seen only through the viewing scope; (b) includes mechanisms for orienting various object-simulations in the enclosure of the simulator to resemble the setting for which the trainee is being trained; (c) provides puncture positions in the cover of the simulator through material that simulates the "feel" of a patient's abdomen; (d) includes quick release fasteners for opening the enclosure to enable convenient set-up for a training situation and to provide access for a supervising trainer needing to check the trainee's progress.

In a second embodiment, the simulator again restricts viewing of the object only through a scope, and provides a cervix-simulation for entry of the instrument and viewing scope. The simulator closely resembles the condition for operating on a patient's uterus; provides mechanisms to position the object-simulation to resemble real life conditions, and again provides easy access for set-up and checking by a supervising trainer.

The invention will be more fully appreciated by reference to the following detailed description and the drawings referred to therein.

BRIEF DESCRIPTION OF THE DRAWINGS

FIG. 2 is a view of the simulator of FIG. 1 showing the top open and illustrating in dash lines one side open for convenient access to the cavity;

FIGS. 3a and 3b are enlarged views of the object-fastening mechanism used in the simulator;

FIG. 4 is a view of an alternate embodiment of the invention;

DESCRIPTION OF THE PREFERRED EMBODIMENT

Figure 1:
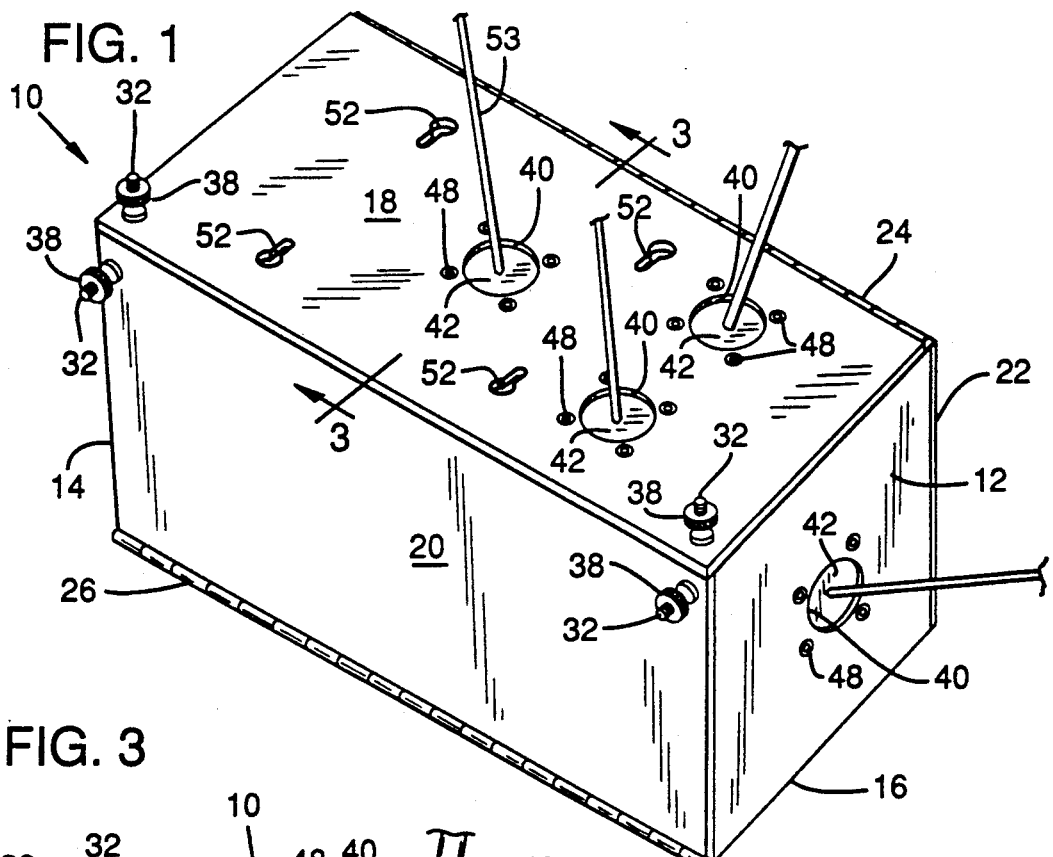
FIG. 1 is a view of a simulator in accordance with the present invention.

The simulators of the present invention provide a cavity that is a simulation of a cavity in which an operational procedure is performed. The simulators of FIGS. 1 and 4 are of the type that have a configuration that affords a surgeon (or individual) practicing the techniques of surgery a simulation of real life operative conditions. Each simulator has a cavity that may be closed both to view and access that requires the surgeon practicing a technique to adhere to movements and manipulation of instruments that mimics real life operating conditions.

Each of the simulators is a shaped container that has a cavity for mounting an object within on which a surgical procedure will be practiced by an individual. Apertures are provided in the container for the insertion of a viewing scope and instruments required for a practice procedure. Each container can be opened for mounting the object within the cavity and is closed so that the individual practicing a procedure is unable to view or have external access to the object except by simulating the techniques that are used in real life conditions. That is, when the container (i.e., simulator) is closed, the individual practicing a procedure on the object must view, manipulate, and use the instruments under view of the scope. Since physical access to the cavity is prevented, except by the instruments inserted through the apertures provided, the individual must manipulate and use the instruments by hand manipulation external to the cavity to control the movement and function of the instruments within the cavity. A simulation of real life conditions is thus provided.

Refer now to FIGS. 1 and 2 of the drawings. They illustrate a simulator 10 having a rectangular shape that has ends 12, 14, a bottom 16, a top (lid) 18 and sides 20, 22. The simulator 10 is preferably constructed of an opaque material such as black plexiglass that does not permit viewing the cavity or the contents therein when the simulator 10 is closed. The top 18 in this embodiment is hinged to the side 22 by a hinge 24 and the side 20 is hinged to the bottom 16 by a hinge 26. Access is thereby provided to the cavity 28 of the simulator 10 by the hinged arrangement of the top 18 and the side 20. A block 30 is fastened to a corner of end 12 where the top 18 and side 20 meet in the closed position and another block is fastened to a corner of end 14 in a similar manner. Threaded studs 32 are fitted to the blocks 30; the studs positioned, as shown in the figure, to enter apertures 34 in top 18 and apertures 36 in side 20 when the top 18 and the side 20 are in the closed position. Threaded fasteners 38 secure the top 18 and the side 20 in the closed position by threadably engaging the studs 32 in a conventional manner.

Figure 3:
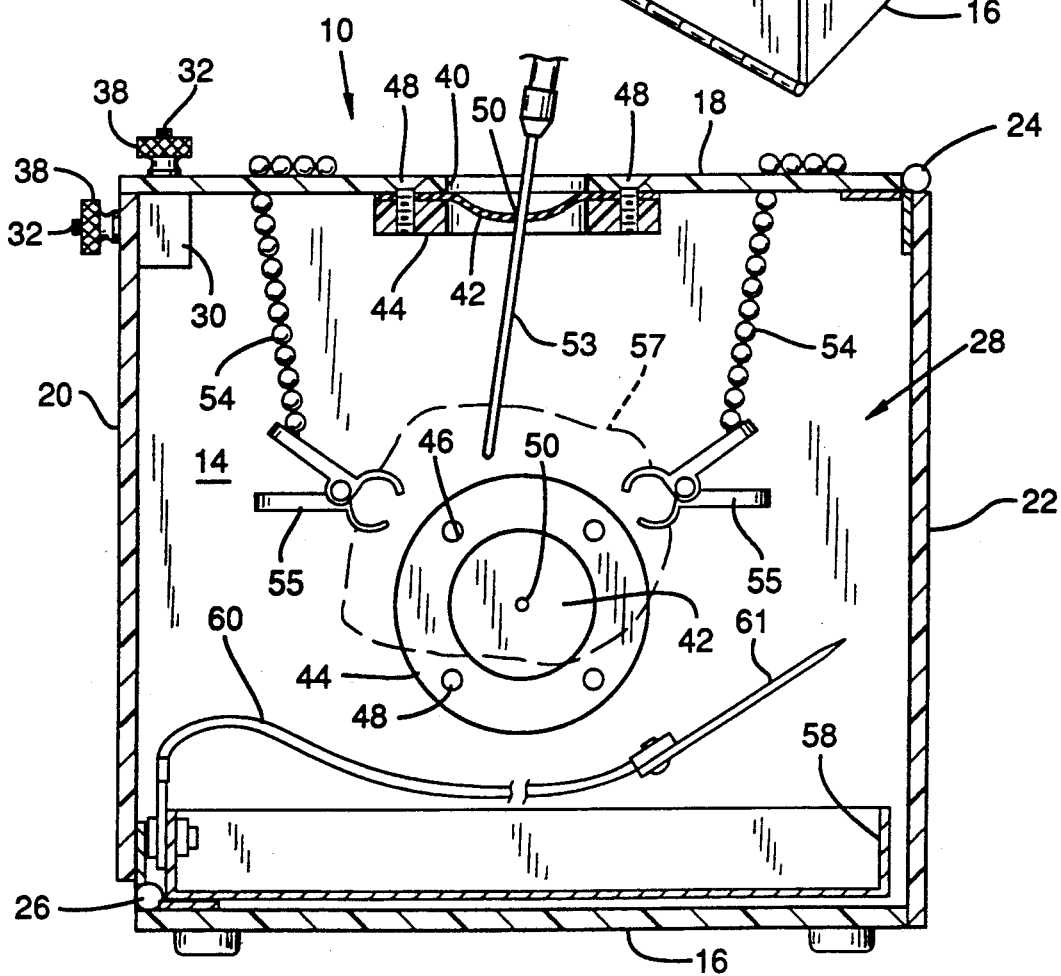
FIG. 3 is a cross section view of the simulator as taken on view lines 3—3 of FIG. 1.

The top 18 is provided with multiple openings 40 as shown in FIGS. 1 and 2 and 3. As best seen in FIG. 3, the openings 40 are fitted with a resilient material 42, such as material used in commercial wet suit construction, which is secured in position by removable ring type flanges 44. The flanges 44 are secured to the top 18 by threaded fasteners 48 threadably installed in the threaded mounting holes. An opening 40, fitted as above described, is also provided in each of the ends 12 and 14. To facilitate entry, e.g. of an instrument 53, through the material 42, a puncture-simulating opening 50 is provided in the material 42 positioned near the center of the opening 40.

The material 42 provides a resistance to movement of the instruments 53 inserted into the cavity 28 of the simulator 10. The resistance afforded by the material 42 resembles the resistance experienced by an instrument traversing an abdominal wall in a human.

As shown in detail in FIGS. 1, 3a and 3b, keyhole type slots 52 are provided in the lid 18 for adjustably inserting a chain 54 in a conventional manner. Clamping devices 55 attached to an end of the chain 54 ar used to suspend objects within the cavity 28 of the simulator 10. A metal tray 58 (shown in section in FIG. 3) that is of a dimension to fit in the bottom of the simulator 10 is provided as a receptacle to receive any fluids used in a practice procedure. A connecting cable 60 having a probe 61 is fitted to the tray 58 and is used to complete the circuitry for practicing electro-surgical procedures.

Figure 6:
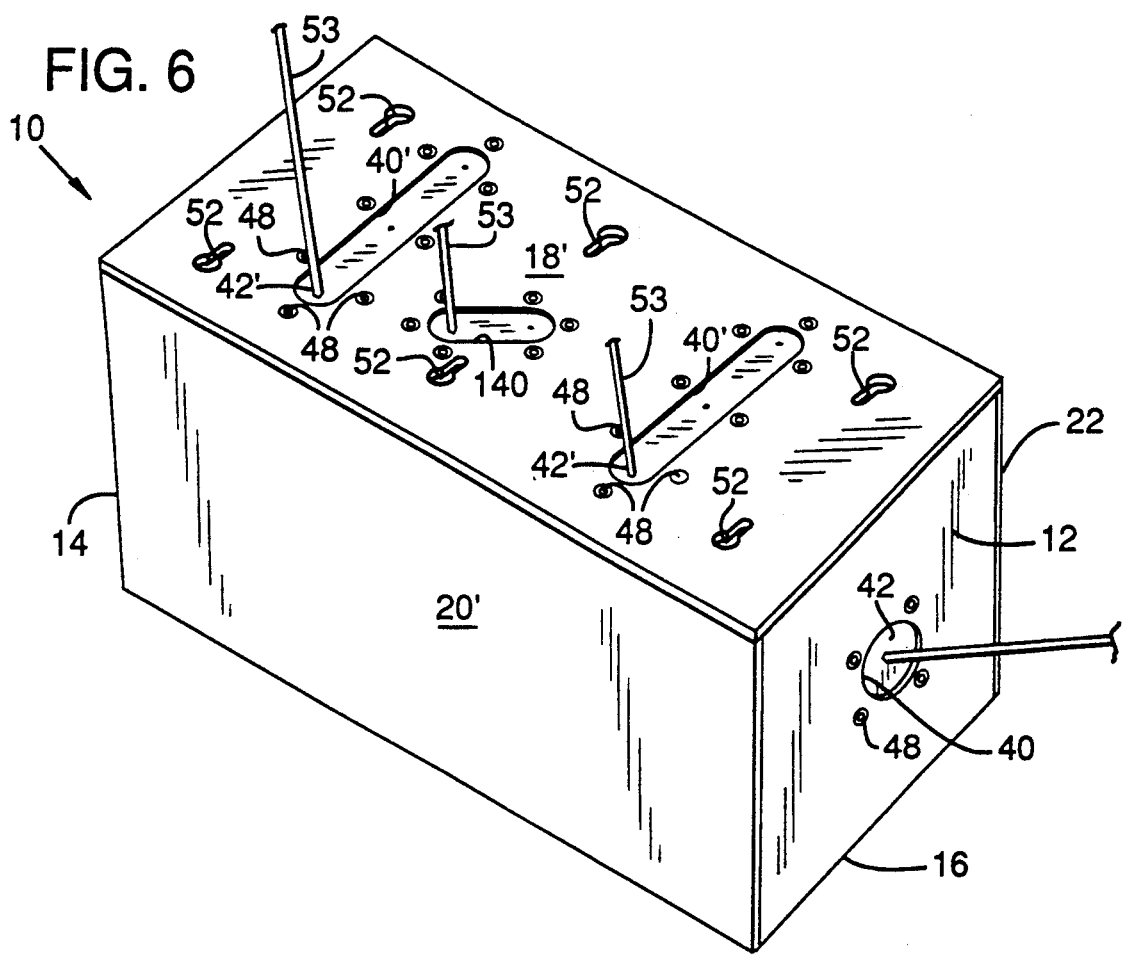
FIG. 6 is an alternate embodiment of the simulator of FIG. 1.
Figure 7:
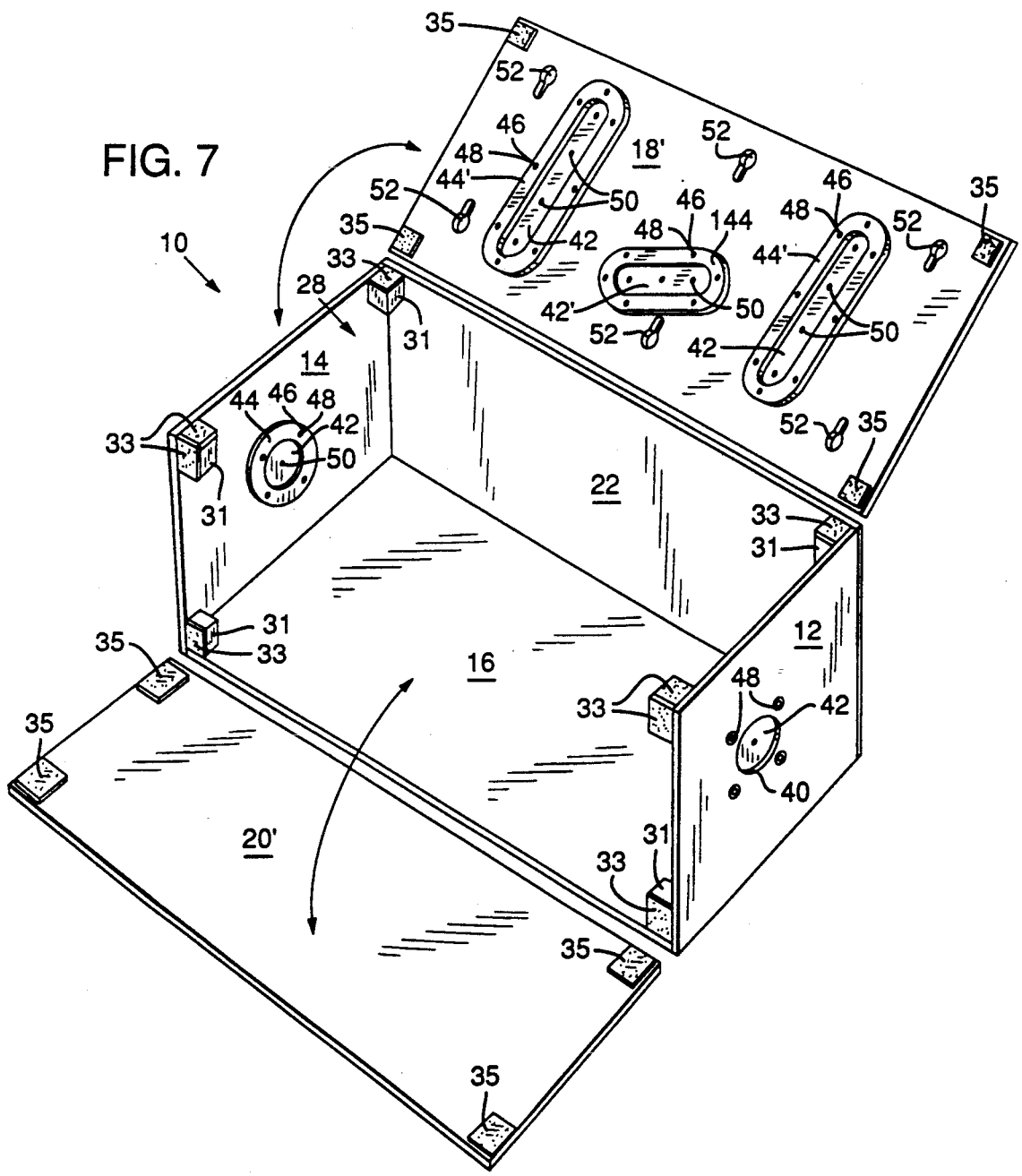
FIG. 7 is a view of the simulator of FIG. 6 showing the top and side removed for convenient access to the cavity.

FIGS. 6 and 7 illustrate an alternate embodiment of the simulator 10. The lid 18' has elongated openings 40' and 140 which are beneficial for training or practice procedures for cholecystectomy. Multiple openings 50 (FIG. 7) are provided in the material 42 in the openings 40' and 140 for insertion of instrumentation.

The lid 18' and side 20' as shown in FIG. 7 are removably retained to the simulator 10 by self adhering fasteners. Retention blocks 31 are strategically positioned on the simulator 10 and have self-adhering fasteners 33, attached as shown. The lid 18' and the side 20' have corresponding fasteners 35 attached to their corner portions which cooperate with the fasteners 3 to retain the lid 18' and side 20' in position. This method of attachment reduces cost yet provides a closable cavity for practicing surgical procedures. The fasteners 33, 35 are of adequate size to prevent dislodging either the lid or side during a practice procedure.

The material 42 is secured in position in the openings 40' by flanges 44' and in the opening 140 by flange 144.

Additional keyhole type slots 52 are also provided for more versatility in positioning of the object within the cavity by the clamping devices 55.

Figure 5:
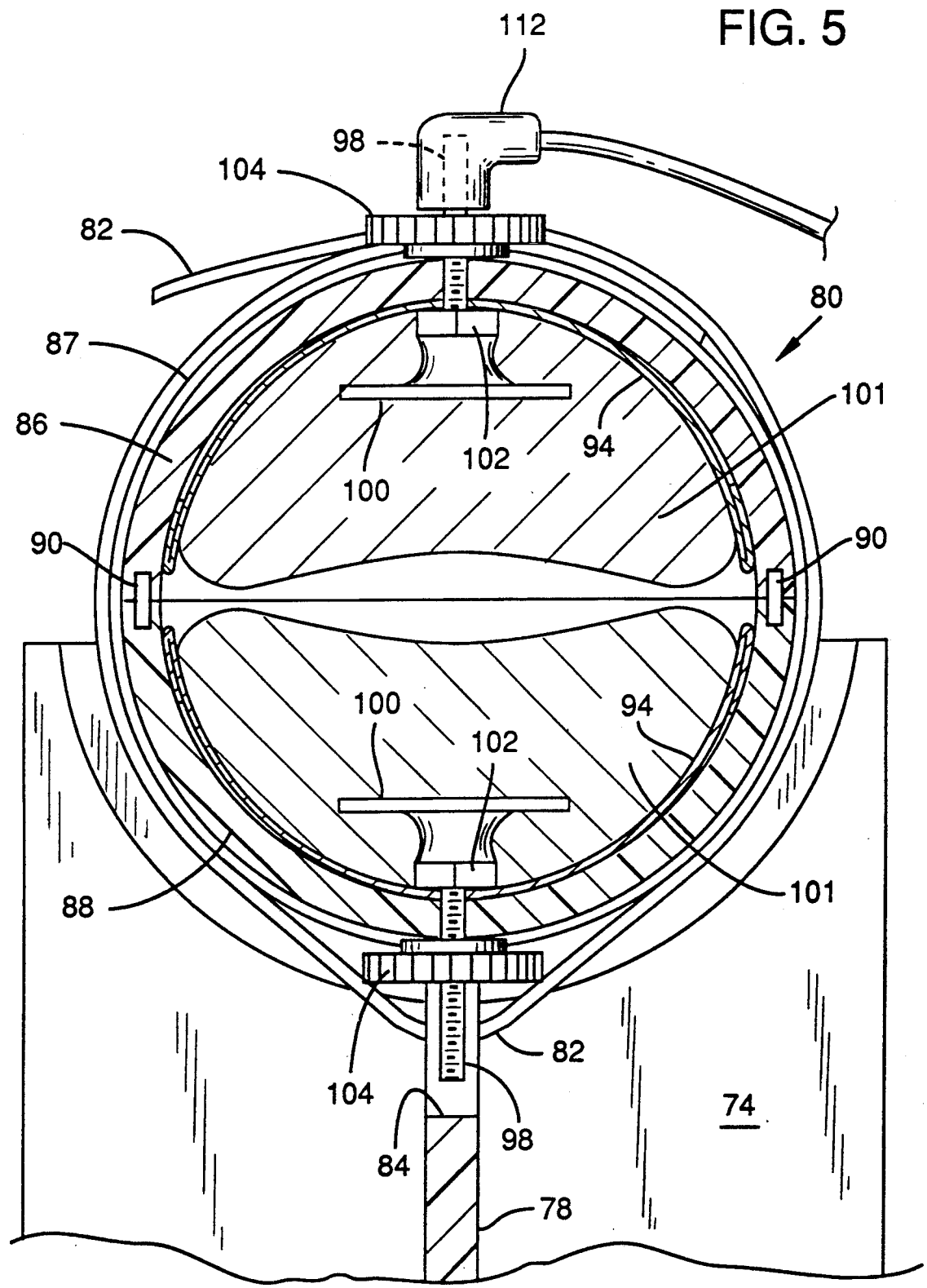
FIG. 5 is a cross section view as taken on view lines 5—5 of FIG. 4.

FIGS. 4 and 5 illustrate another embodiment of a simulator designated by the numeral 70. The simulator 70 has a tray type base 72 suited for holding or receiving a quantity of liquid. Mounted to the base 72 and extending upwardly as illustrated in the figures are two mounting brackets 74 and 76. The brackets are interconnected by a connecting rib 78 to provide a rigid mounting for the cylindrical body 80. The extended ends of the brackets 74 and 76 are configured to accept the mounting of the body 80 as shown in FIG. 5. In this embodiment, the body 80 is retained on the brackets 74, 76 by a strap 82 that is inserted through a slot 84 in the connecting rib 78 and encircles the body 80 and the connecting strap 87 that holds the sections 86, 88 together. The strap 82 is preferably of a self adhering material such as VELCRO. The body 80 is reversibly mountable on the brackets 74, 76.

The body 80 is a hollow cylinder that is split into two half sections 86 and 88 on a plane along its longitudinal axis. It is preferable to have locating pins 90 as shown in FIG. 5 fixedly installed in half section 86 and slidably insertable into half section 88 for locating section 86 relative to section 88 when fitted together. The sections 86 and 88 are held together by a self adhering strap 87 that encircles the sections.

Bores 92 shown in FIG. 4 are provided in each of the sections 86 and 88 for the removable installation of arcuate plate inserts 94. The inserts 94 conform to the internal cavity of the sections 86, 88 and have suitable bores 96 aligned with the bores 92 of the sections 86, 88. Threaded retainers 98 are utilized to retain the inserts 94 in the sections 86, 88. The retainers 98 are threaded studs having a tapered cross member 100 fitted on one end. A nut 102 is threaded on the retainer 98 until it is positioned at a distance from the cross member 100. The nut 102 will position the cross member 100 at a distance from the surface of the insert 94 at installation. An insert is placed within the section 86 and a retainer 98 is inserted through each bore 96 of the insert 94 and an aligned bore 92 in the section 86 with the nut 102 abutting the internal surface of the insert 94. A threaded nut 104, preferably knurled for ease of installation and removal, is threadably installed on the end of each retainer 98 protruding through the section 86 to retain the retainer 98 and thus the insert 94 in the section 86. Another insert 94 is similarly installed in section 88. The threaded studs of the retainer 98 are of sufficient length to extend beyond the knurled nut 104 to permit a connecting electrical cable to be attached.

The sections 86 and 88 when fitted together form the cylindrical body 80. One end of the body 80 has a center bore 106 having its centerline aligned with the longitudinal axis of the body 80. A groove 108 is formed in the body 80 surrounding the bore 106 as shown in the figure. An elastomeric boot 110 having an extending rim 111 on one end is installable in the bore with the rim 111 fitting in the groove 108. The boot 110 has the resiliency and dimension to simulate a cervix.

A connecting cable 112 having at least two connectors is provided for making an electrical connection to the inserts 94 installed in the body 80. One connector of the cable 112 is connected to a retainer 98 that is connected to an insert 94 installed in section 86 and the other connector is connected to a retainer 98 that is connected to a insert 94 installed in section 88.

METHOD OF USE

The simulator 10 provides a cavity for simulating operative (and diagnostic) procedures in a cavity of a human body such as a peritoneal cavity.

The side 20 and top 18 being hinged provide assess to the cavity 28 for setting up the simulator 10 for a procedure to be practiced. Although not shown, it will be understood that clamps manipulated by the trainee may be inserted through the material 42 in the openings 40 located at the ends 12 and 14 of the simulator or they may be inserted through an opening 40 in the cover 18. The clamps will hold an object in position for the operating procedure in the same way as would be required in an actual operation. Objects may be suspended from the top 18 by the clamp 55 suspended from the adjustable chain links 54. The object 57 suspended from the chain held clamps 55 represents an organ. The position at which the object 57 is suspended by the chains is adjusted by adjusting the chain 5 in the keyhole slot 52.

For practicing electro-surgical and laser techniques, the object 57 either suspended freely or clamped, is electrically connected by the probe 61 connected to the metal tray 58. The connecting cable 60 is connected to a power source which is not shown.

Once the object is in the desired position the side 20 and top 18 (if not previously closed) are closed. A viewing scope and instruments to be utilized in practicing a procedure are inserted through the material 42 in the openings 40 in the top 18.

The closed cavity of the simulator 10 forces the surgeon practicing a routine to manipulate and use the instruments for a procedure under like conditions in real life. The material 42 in the openings 40 resist instrument movement to simulate the "feel" that is experienced when an instrument traverses an abdominal wall of a real person. The cavity, being closed to outside view and access to the contents therein, forces the surgeon to adhere to the use of the scope and the manipulative movements and usage of the instruments under conditions like that which is experienced in real life.

The simulator 70 similarly provides a cavity for simulating operative (and diagnostic) procedures. The simulator 70 has a cavity that is representative of a cavity of an organ such as a uterus.

The body 80 of simulator 70 is split into the two sections 86 and 88 to thereby provide access to the cavity. A tissue sample 101, such as beef tongue is attached to each of the inserts 94. The cross member 100 of the retainer 98 is inserted into a slit made in the sample and rotated transverse to the slot for retention purposes. The retainers are inserted through the inserts 94 and bores 92 of the sections 86, 88 to retain the sample in position. The retainers and the inserts make an electrical connection to the sample. The sections are fitted together with the boot 110 fitting in the groove 108. The boot 110 is selected to be of a diameter of a cervix of the uterus and closely approximates the resiliency of a cervix. The tissue sample 101 (i.e. beef tongue) attached to each of the sections 86, 88 thus provide a simulation of the uterus. The sections 86, 88 fitted together of course provide a cavity that is closed to view and access except through the simulated cervix (boot 110). For a procedure involving an electrosurgical technique such as using a roller ball, the connecting cable 112 is connected to a retainer on each of the sections 86, 88 to provide an electrical circuit to support the roller ball instrumentation. To practice the procedure, the surgeon must insert the instruments required such as the scope, roller ball, etc. through the boot 110 (simulated cervix). The surgeon practicing a procedure thus must adhere to movements and use of instruments under conditions that mimic real life procedures. The reversibility of the mounting of the body 80 on brackets 74, 76 also simulates either an anteverted or retroverted uterus.

While only two examples of procedures have been listed, it is apparent that many different procedures may be practiced utilizing the simulators of the present invention. The simulators may be used for diagnostic training as well as for surgical procedures. They will aid the individual in learning the manual dexterity of unfamiliar movements required with the non-standard eye hand coordinate movements. As will be appreciated the simulators are readily adapted for practicing or training in suturing, resection, cutting and other procedures.

What is claimed is:

1. A simulator for an individual to practice endoscopic procedures used in surgical and diagnostic techniques, comprising:
    a container having a cavity and said container having at least one aperture providing entry to said cavity for inserting a viewing scope and an instrument to be used to practice a surgical procedure;
    access means selectively opening said container for setting up a practice procedure and closing said container to prevent viewing of said cavity other than through said viewing scope;
    means for mounting an object simulating a human organ in the cavity; and,
    an electrical connector connectable to the object for completing an electrical circuit of an operating procedure using an electrical surgical instrument whereby the individual can practice the operating procedure under conditions closely resembling actual conditions.

2. A simulator as defined in claim 1, including;
    a resilient material covering said aperture, said material having a puncture opening providing resisted penetration to the insertion and movement of instruments for simulating an instrument inserted through an abdominal wall.

3. A simulator as defined in claim 2, wherein;
    said access means includes a lid and a side, said lid and said side being openable to provide access to said cavity and being closeable to prevent viewing access to said cavity other than through the viewing scope.

4. A simulator as defined in claim 3, wherein;
    said aperture of said container is provided in said lid.

5. A simulator as defined in claim 4 wherein;
    multiple apertures are provided in the container for insertion of an object holding instrument for holding the object, and for insertion of a viewing scope and for insertion of a surgical instruments.

6. A simulator as defined in claim 5 wherein the aperture for the holding instrument is provided in an end wall of the container.

7. A simulator as defined in claim 6 wherein the mounting means is a clamp suspended from the lid by an adjustable tether for adjusting the position of the object in the container.

8. A simulator as defined in claim 1 including means for an individual to practice endoscopic procedures used in surgical and diagnostic techniques, comprising:

a container having a cavity and said container having at least one aperture providing entry to said cavity for inserting a viewing scope and an instrument to be used to practice a surgical procedure;

access means selectively opening said container for setting up a practice procedure and closing said container to prevent viewing of said cavity other than through said viewing scope;

means for mounting an object simulating a human organ in the cavity, and means for receiving a liquid circulated through the container whereby the individual can practice the operating procedure under conditions closely resembling actual conditions.

9. A simulator as defined in claim 8 wherein a tray is mounted under the container for collecting the flow of liquid from the container.

10. A simulator for an individual to practice endoscopic procedures used in surgical and diagnostic techniques, comprising:

a container having a cavity and said container having at least one aperture providing entry to said cavity for inserting a viewing scope and an instrument to be used to practice a surgical procedure;

access means selectively opening said container for setting up a practice procedure and closing said container to prevent viewing of said cavity other than through said viewing scope;

means for mounting an object simulating a human organ in the cavity; and, said aperture is an elastomeric boot that simulates a cervix entry into a uterus, and the container is configured to simulate the uterus, whereby the individual can practice the operating procedure under conditions closely resembling actual conditions.

11. A simulator as defined in claim 10 wherein the container is a cylinder having a tilted axis defining upper and lower semi-cylinders, animal tissue adhered to the upper and lower semi-cylinders to generate a uterus-like enclosure, and said aperture provided at one end substantially on the cylindrical axis and extended toward the separation between said upper and lower semi-cylinders.

12. A simulator as defined in claim 11 wherein mounting brackets are mounted on the top and bottom respectively of the top and bottom semi-cylinders, said mounting brackets having a t-shaped head extended into the cavity to be inserted and twisted in the animal tissue for adhering the tissue to the semi-cylinders.

13. A simulator as defined in claim 12 wherein an electrical connection is connected to a mounting bracket for completing electrical circuitry for use of an electrical surgical instrument.

* * * * *